(12) United States Patent
Zhdanov

(10) Patent No.: US 7,324,899 B2
(45) Date of Patent: Jan. 29, 2008

(54) GEOPHYSICAL TECHNIQUE FOR MINERAL EXPLORATION AND DISCRIMINATION BASED ON ELECTROMAGNETIC METHODS AND ASSOCIATED SYSTEMS

(75) Inventor: Michael S. Zhdanov, Salt Lake City, UT (US)

(73) Assignees: University of Utah, Salt Lake City, UT (US); University of Utah Research Foundation, Salt Lake City, UT (US)

(*) Notice: Subject to any disclaimer, the term of this patent is extended or adjusted under 35 U.S.C. 154(b) by 0 days.

(21) Appl. No.: 11/492,221

(22) Filed: Jul. 24, 2006

(65) Prior Publication Data

US 2007/0061080 A1    Mar. 15, 2007

Related U.S. Application Data

(60) Provisional application No. 60/739,236, filed on Nov. 22, 2005, provisional application No. 60/701,931, filed on Jul. 22, 2005.

(51) Int. Cl.
*G01V 1/40* (2006.01)

(52) U.S. Cl. ......................................................... 702/7

(58) Field of Classification Search ................... 702/6, 702/7, 2

See application file for complete search history.

(56) References Cited

U.S. PATENT DOCUMENTS

| | | | |
|---|---|---|---|
| 3,967,190 A | 6/1976 | Zonge | |
| 4,626,773 A | 12/1986 | Kroeger et al. | |
| 4,642,570 A | 2/1987 | Sternberg et al. | |
| 4,654,598 A | 3/1987 | Arulanandan et al. | |
| 4,686,477 A | 8/1987 | Givens et al. | |
| 4,875,015 A | 10/1989 | Ward | |
| 5,280,284 A | 1/1994 | Johler | |
| 6,138,590 A | 10/2000 | Colburn, Jr. | |
| 6,771,206 B2 | 8/2004 | Berthelier et al. | |
| 6,876,878 B2 | 4/2005 | Zhdanov | |

OTHER PUBLICATIONS

Ostrander, A.G. and Zonge, K.L., Complex Resistivity Measurements of Sulfide-Bearing Synthetic Rocks, 48th Annual International SEG Meeting, Nov. 1, 1978, 38 pages, San Francisco, CA.

(Continued)

*Primary Examiner*—Donald E McElheny, Jr.
(74) *Attorney, Agent, or Firm*—Thorpe North & Western LLP

(57) ABSTRACT

Mineral exploration needs a reliable method to distinguish between uneconomic mineral deposits and economic mineralization. A method and system includes a geophysical technique for subsurface material characterization, mineral exploration and mineral discrimination. The technique introduced in this invention detects induced polarization effects in electromagnetic data and uses remote geophysical observations to determine the parameters of an effective conductivity relaxation model using a composite analytical multi-phase model of the rock formations. The conductivity relaxation model and analytical model can be used to determine parameters related by analytical expressions to the physical characteristics of the microstructure of the rocks and minerals. These parameters are ultimately used for the discrimination of different components in underground formations, and in this way provide an ability to distinguish between uneconomic mineral deposits and zones of economic mineralization using geophysical remote sensing technology.

26 Claims, 2 Drawing Sheets

OTHER PUBLICATIONS

Kenneth L. Zonge and Jeffrey C. Wynn, Recent Advances and Applications in Complex Resistivity Measurements, Geophysics, Oct. 1975, p. 851-864, Society of Exploration Geophysicists, vol. 40, No. 5.

W.H. Pelton et al, Mineral discrimination and Removal of Inductive Coupling with Multifrequency IP, Geophysics, Apr. 1978, p. 588-609, Society of Exploration Geophysicists, vol. 43, No. 3.

Norris, A.N. et al, Effective medium theories for two-phase dielectric media, J. Appl. Phys., Exxon Research and Engineering Company, Corporate Research Science Laboratories, Mar. 15, 1985, American Institutie of Physics.

Donald J. Marshall and Theodore R. Madden, Induced Polarization, A Study of its Causes, Geophysics, vol. XXIV, No. 4, Oct. 1959, pp. 790-816.

Kenenth S. Cole et al., Dispersion and Absorption in Dielectrics, Journal of Chemical Physics, vol. 10, Feb. 1942, pp. 98-105, http://jcp.aip.org/jcp/copyright.jsp.

Catherine De Groot-Hedlin and Steven Constable, Inversion of magnetotelluric data for 2D structure with sharp resistivity contrasts, Geophysics, vol. 69, No. 1, Jan.-Feb. 2004, p. 78-86, Society of Exploration Geophysicists.

Torquil Smith et al., Sharp Boundary Inversion of 2-D Magnetotelluric Data, Geophysical Prospecting, Jul. 1999, 22 pages, Department of Materials Science and Mineral Engineering, University of California Berkeley.

Ronald S. Bell and Mark H. Cramer, Symposium on the Application of Geophysics to Engineering and Environmental Problems, Apr. 28-May 2, 1996, Environmental and Engineering Geophysical Society, p. 677-686.

● disseminated spherical grain

■ matrix

⊘ disseminated ellipsoidal grain

GEOPHYSICAL TECHNIQUE FOR MINERAL EXPLORATION AND DISCRIMINATION BASED ON ELECTROMAGNETIC METHODS AND ASSOCIATED SYSTEMS

RELATED APPLICATIONS

This application claims the benefit of U.S. Provisional Patent Application No. 60/701,931, filed Jul. 22, 2005, and of U.S. Provisional Patent Application No. 60/739,236, filed Nov. 22, 2005, which are each incorporated herein by reference.

GOVERNMENT INTEREST

This invention was made with government support under grant #DE-FC26-04NT42081, awarded by Department of Energy. The Government has certain rights to this invention.

FIELD OF THE INVENTION

The present invention relates in general to electromagnetic (EM) geophysical method of remote sensing the complex heterogeneous rock formations. The method can be applied for subsurface material characterization, mineral exploration and mineral discrimination. The invention can find an application for studying the underground geological structures in mineral, hydrocarbons and groundwater exploration, in particularly, for distinguishing between uneconomic mineral deposits and economic mineralization.

BACKGROUND OF THE INVENTION

Electromagnetic data observed in geophysical experiments, in general, reflect two phenomena: 1) electromagnetic induction (EMI) in the earth, and 2) induced polarization (IP) effects related to the relaxation of polarized charges in rock formations. The IP effect is caused by complex physical-chemical polarization process that accompanies current flow in the earth. These reactions take place in a heterogeneous medium which is most often rock formations in areas of mineralization.

The effective conductivity of rocks is not necessarily a constant and real number but may vary with frequency and be complex. There are several offered explanations for these properties of effective conductivity. Most often they are explained by physical-chemical polarization effects of mineralized particles of the rock material, and/or by the electrokinetic effects in the poroses of reservoirs. This phenomenon is usually explained as a surface polarization of the mineralized particles and the surface of the moisture-porous space, which occurs under the influence of the external electromagnetic field. This influence is manifested by accumulating electric charges on the surface of different grains forming the rock.

The IP effect may also be used to separate the responses of economic polarized targets from other anomalies. This idea was originally discussed in U.S. Pat. No. 3,967,190 issued to Zonge. However, until recently this idea had very limited practical applications because of difficulties in recovering induced polarization parameters from the observed electromagnetic (EM) data, especially in the case of 3-D interpretation required for efficient exploration of the mining targets.

As such, there remains a need for improved methods and technology for remote subsurface formation characterization and mineral discrimination. A new technique is therefore needed and continues to be sought through ongoing research and development efforts.

SUMMARY OF THE INVENTION

The quantitative interpretation of IP data in a complex 3-D environment is a very challenging problem. The analysis of IP phenomena is usually based on models with frequency dependent complex conductivity distribution. One of the most popular is the Cole-Cole relaxation model and various different modifications. The parameters of the conductivity relaxation model can be used for discrimination of the different types of rock formations, which is an important goal in mineral exploration. Until recently, these parameters have been experimentally determined mostly in a physical lab by direct analysis of the rock samples. It will be extremely useful for practical applications to provide a geophysical technique for determining 3-D distribution of the same parameters of rock formations in the field from remote geophysical observations.

The method and systems of the present invention are based on a composite geoelectrical model of rock formations, which generates a conductivity relaxation model with parameters directly related by analytical expressions to physical characteristics of microstructure of rocks and minerals (micro geometry and conductivity parameters). The composite geoelectrical model of the present invention provides more realistic representation of the complex rock formations than conventional unimodal conductivity models. Further, the model and systems of the present invention allow modeling of the relationships between physical characteristics of different types of mineral (e.g. conductivities and sulfide grain sizes) and parameters of the relaxation model. As a result, the method of the present invention allows determination of the internal structure and physical characteristics of the different rock formations by remote geophysical techniques without drilling of wells or core sampling.

The composite geoelectrical model and systems of the present invention allow detection of induced polarization effects in electromagnetic data and uses surface geophysical observations to determine the parameters of the conductivity relaxation model corresponding to the surveyed volume of earth. These parameters are ultimately used for the discrimination of different types of rock formation as more fully described herein below.

One aspect of the present invention provides a geophysical method which can remotely measure the complex frequency dependent electrical conductivity of the rocks. Further, a theoretical composite model is developed and a method for quantitative interpretation of IP data in a complex 3-D environment is outlined. An important part of this invention includes a new generalized effective medium model of the IP effect, which treats in a unified way different complex models of multiphase composite models of rocks or other formations. These new models and methods can be used for examining the IP effect in complex rocks formations with different mineral structures and electrical properties.

In accordance with another aspect of the present invention, the methods and systems can be used for interpretation of ground, borehole, and airborne EM data recorded by EM receivers from EM sources, e.g. either from controlled EM transmitters or by recording EM fields from natural sources. The transmitters and receivers can be galvanic and/or inductive in construction. Parameters of the relaxation model recovered from this EM data are used for the discrimination of different formations, and in this way provide an ability to distinguish between uneconomic mineral deposits and zones of economic mineralization using geophysical remote sensing technology.

In yet another aspect of the present invention, systems for identifying and mapping underground formations can include an array of receivers which are operatively coupled to a data storage device for acquiring the EM data responses in an electromagnetic (EM) field which passes through the underground formation. A data processor can be configured to accept data from the data storage device. The data processor can also be configured to manipulate these EM data responses as outlined herein to identify and map underground formations.

In still another aspect of the invention, a computer readable data storage medium can include a computer readable code embodied thereon. The code can include an input routine for receiving the electromagnetic data; a 3-D inversion routine; a transformation routine which utilizes the analytical expression of theoretical effective conductivity; a calculation routine; an evaluation routine; and an output routine for communicating or displaying results of the calculations in a useable form, e.g. a 3-D map of the conductivity model parameters, mineral, water or oil content per volume summaries, etc.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
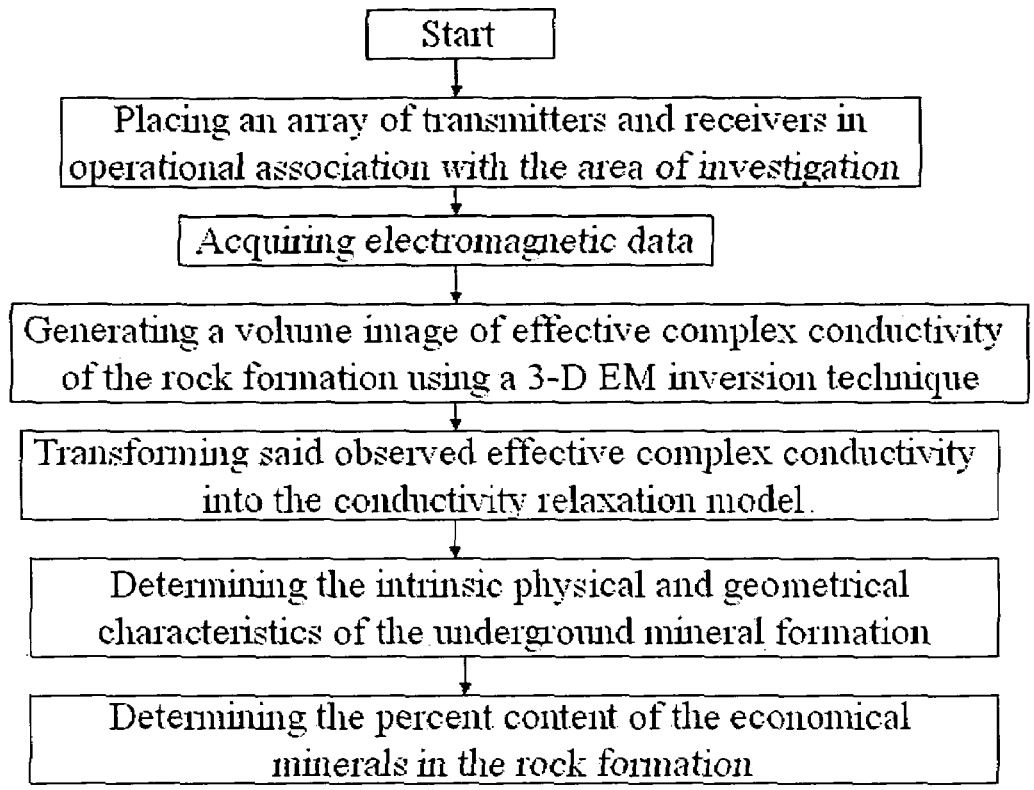
FIG. 1 is a flow chart illustrating a technique for mineral exploration and mineral discrimination based on electromagnetic methods.

It will be understood that the above figures are merely for illustrative purposes in furthering an understanding of specific embodiments of the invention. Figures are not necessarily drawn to scale, thus dimensions and other aspects may vary to make illustrations thereof clearer. Therefore, departure can be made from the specific dimensions and aspects shown in the figures in accordance with the present invention.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "a substrate" includes one or more of such substrates, and reference to "the layer" includes reference to one or more of such layers.

Definitions

In describing and claiming the present invention, the following terminology will be used in accordance with the definitions set forth below.

As used herein, "underground formations" refers to any sub-terrain which includes heterogeneous materials. Non-limiting examples of underground formations include, rock formations, seabed sub-terrain, bedrock, strata, oil deposits (shale, sands, etc.), and the like.

As used herein, "mapping" or "map" refers to a three-dimensional graphic or data representation of the underground formation which identifies position and type of at least one material of interest, e.g. iron, gold, copper, oil, etc.

As used herein, "operatively coupled" refers to any connection which allows transfer of identified information. Such transfer need not be instant and can be time delayed, e.g. by storage on a portable storage device for later transfer to a processer/storage device. Such operatively coupled devices can be coupled by wired, wireless, time delay or other connections.

As used herein, "phase" when used in connection with two phase, three phase, etc., refers to distinct phases of materials which are discrete from one another. For example, a quartz monzonite formation having pyrite and chalcopyrite grains would represent a three phase system.

As used herein, "substantial" and "substantially" when used in reference to a quantity or amount of a material, or a specific characteristic thereof, refers to an amount that is sufficient to provide an effect that the material or characteristic was intended to provide. Therefore, "substantially free" when used in reference to a quantity or amount of a material, or a specific characteristic thereof, refers to the absence of the material or characteristic, or to the presence of the material or characteristic in an amount that is insufficient to impart a measurable effect, normally imparted by such material or characteristic.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Frequencies, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 Hz to about 50 Hz" should be interpreted to include not only the explicitly recited values of about 1 Hz and about 50 Hz, but also include individual values and sub-ranges within the indicated range. Thus, included in this numerical range are individual values such as 2, 10, and 40 and sub-ranges such as from 1-3, from 20-40, and from 30-50, etc. This same principle applies to ranges reciting only one numerical value. Furthermore, such an interpretation should apply regardless of the breadth of the range or the characteristics being described.

The Invention

The present invention provides a technique for detecting the IP effects in frequency domain and time domain electromagnetic (EM) data and three dimensional inversion of this data based on the appropriate relaxation models. The method of the present invention takes into account the nonlinear nature of both electromagnetic induction and IP phenomena and inverts the EM data for the corresponding relaxation model parameters. The goal of the EM geophysical survey is determining all the parameters of the conductivity relaxation model simultaneously.

Broadly, the invention comprises a method of identifying underground mineral formations. In one aspect, the method involves placing an array of receivers and optional transmitters in operational association with the area of investigation. For example, the receivers can be placed on the ground, in a borehole, at the sea bottom, and/or suspended in the air above the terrain of interest. If used, the transmitters can generate a harmonic (frequency domain) and/or a pulse (time domain) primary EM field which propagates through the geological formations. The transmitters can be any suitable transmitter such as an electrode or induction coil configured to send a known EM field. The primary field interacts with the formation to produce a scattered field, which is recorded by the receivers. The scattered EM field components measured by the receivers are used to determine an observed effective complex conductivity of the rock formation as a function of position and frequency or time using a 3-D EM inversion technique. The desired intrinsic physical and geometrical characteristics of the composite medium, such as conductivities and mineral grain or porous sizes and their volume contents, may then be derived from this data. In one alternative embodiment of this invention, the receiver measures the EM response from the underground formation generated by a natural source (e.g., magnetotelluric field) without the use of separate transmitters. Similarly, receivers can include any EM receiver which is capable of acquiring EM signals and communicating such signals to a data processor and/or data recording medium.

More specifically, an underground mineral formation in an examined medium may be located and characterized through a method comprising the steps of:

a) acquiring electromagnetic data using EM receivers to measure amplitude and frequency or time responses in electric and magnetic fields, said electromagnetic (EM) field generated by natural sources (e.g., magnetotelluric field) or by transmitting electrodes or induction coils directing a transient (frequency domain or time domain) EM field through a volume of earth;

b) determining an observed effective complex conductivity of the rock formation as a function of position and frequency or time using a 3-D EM inversion technique;

c) transforming said observed effective complex conductivity into the conductivity relaxation model of the rock formation as a function of position and frequency or time using a multi-phase physical and mathematical model of the composite medium introduced in this invention in the form of the corresponding analytical expressions for the theoretical effective conductivity;

d) determining the intrinsic physical and geometrical characteristics of the composite medium: the conductivity contrast between the different phases of the medium, the size and volume of the inclusions, etc. (e.g. conductivities and mineral grain or porous sizes), using analytical expression of effective conductivity as a function of frequency and multi-phase rock model parameters;

e) determining the percent content of the economical minerals in the rock formation as a function of a position within the examined volume of the earth;

d) correlating said parameters with known geological formations for subsurface material characterization, mineral exploration and mineral discrimination.

The following explanation of the principles of mineral exploration and mineral discrimination technique based on EM method is offered to assist those skilled in the art to practice the invention. It is not intended thereby to limit the scope of the invention to any particular theory of operation or to any field of application.

FIG. 1 shows a flow chart of an embodiment of a method in accordance with the current invention. According to this flow chart, the EM data are acquired by placing an array of receivers and optional transmitters in operational association with the area of investigation. The transmitters and receivers may be either galvanic (electrodes) or inductive (induction coils) in construction and can be of any suitable type such as, but not limited to, transmitting electrodes, electric bipole, wire loops, antennas, induction coils, or the like. Transmitters and receivers of both types may be used in specific applications. The receivers record the frequency domain or time domain EM field of the natural origin (e.g., magnetotelluric field) or the field produced by the transmitter(s) and scattered back from the underground formations.

In order to generate a volume image of effective complex conductivity of the rock formation a 3-D EM inversion technique for interpretation of the observed EM data in the receivers is used. Depth of the received data is a function of the particular geological formation and is more strongly a function of the frequency or time, e.g. inversely proportional to the square root of frequency for frequency domain data or proportional to the square root of time for time domain. Electrical conductivity of the medium, $\sigma(r|\omega)$, is is assumed complex and frequency dependent (where r is a radius-vector of the point within the medium in some Cartesian coordinate system, and $\omega$ is a frequency). One goal of the inversion is to find a spatial distribution of this function from the observed EM data. Several numerical methods can be used, although one numerical method approach which can be particularly effective in solving this problem is well developed (e.g., Zhdanov, M. S., 2002, Geophysical inverse theory and regularization problems: Elsevier, Amsterdam-New York-Tokyo, which is incorporated by reference herein). Although the following analysis is applied using primarily frequency domain data, analogous time domain expressions can be readily derived by applying Fourier transformations, e.g. Fourier and fast-Fourier transforms. In general, time domain signals can be easier to send, but can be somewhat difficult to filter. In contrast, frequency domain signals can be much easier to filter and use, but tend to require more care to achieve regular periodic signals. Those skilled in the art are capable of taking each type of signal and associated difficulties into account when implementing the methods and systems of the present invention.

As an example, a typical EM survey consisting of a set of electrical and magnetic receivers and an arbitrary EM transmitter can be arranged. The transmitter generates a frequency domain EM field. The operating frequencies are usually selected to be in a range of 0.01 Hz-100 KHz, and are typically varied across this range to target various depths of penetration, depending on the target volume, desired resolution, and the type of material surveyed. The EM field recorded by the receivers, $\{E(r_j), H(r_j)\}$ can be represented as an integral over the electric current induced in the in homogeneity, $j(r)=\Delta\sigma(r|\omega)E(r)$, according to the following integral formula:

$$E(r_j) = \iiint_D \hat{G}_E(r_j|r) \cdot [\Delta\sigma(r|\omega)E(r)]dv + E^{norm}(r_j), \quad (1)$$

$$H^a(r_j) = \iiint_D \hat{G}_H(r_j|r) \cdot [\Delta\sigma(r|\omega)E(r)]dv + H^{norm}(r_j), \quad (2)$$

where $\hat{G}_E(r_j|r)$ and $\hat{G}_H(r_j|r)$ are the electric and magnetic Green's tensors defined for an unbounded conductive medium with the normal (horizontally layered) conductivity $\sigma_{norm}$; $\{E^{norm}, H^{norm}\}$ is the normal EM field generated in the horizontally layered background model; and domain D represents a volume with the anomalous conductivity distribution $\Delta\sigma = \sigma - \sigma_{norm}$, $r \in D$.

In short form, equations (1) and (2) can be written as:

$$d = A(\Delta\sigma), \quad (3)$$

where A is a forward modeling operator, d stands for the observed EM data in the receivers, and $\Delta\sigma$ is a vector formed by the anomalous conductivities within the targeted domain. The inversion is based on minimization of the Tikhonov parametric functional, $P^\alpha(\Delta\sigma)$, with the focusing stabilizer s $(\Delta\sigma)$ (Zhdanov, 2002):

$$p^\alpha(\Delta\sigma) = \|A(\Delta\sigma) - d\|^2 + \alpha s(\Delta\sigma), \quad (4)$$

where $\alpha$ is a regularization parameter.

There are several different possible choices for the stabilizer. In one aspect of the present invention, a minimum support stabilizer ($s_{MS}$), or the minimum gradient support stabilizer ($s_{MGS}$) can be used. The minimum support stabilizer is proportional to the area (support) of the nonzero values of the difference between the current model $\Delta\sigma$ and the a priori model $\Delta\sigma_{apr}$:

$$s_{MS}(\Delta\sigma) = \iiint_D \frac{(\Delta\sigma - \Delta\sigma_{apr})^2}{(\Delta\sigma - \Delta\sigma_{apr})^2 + e^2} dv, \quad (5)$$

where e is the focusing parameter.

The minimum gradient support stabilizer is proportional to the area (support) of the nonzero values of the gradient of the current model $\nabla\Delta\sigma$:

$$s_{MGS}(\Delta\sigma) = \iiint_D \frac{|\nabla\Delta\sigma|^2}{|\nabla\Delta\sigma| + e^2} dv. \quad (6)$$

The focusing regularized inversion helps generating more reliable images of the subsurface structures. The detailed principles of the optimal focusing parameter selection are discussed in Zhdanov, 2002. If no comparative data is known, $\Delta\sigma_{apr}$ can be set to zero, although known data can help to converge more quickly on a useful solution.

The most preferred approach to minimization of the parametric functional $P(\Delta\sigma)$ is based on using gradient type methods, although other approaches such as genetic algorithm, objection optimization, and the like could be used. For example, the regularized conjugate gradient (RCG) algorithm of the parametric functional minimization can be summarized as follows (Zhdanov, 2002):

$$r_n = A(\Delta\sigma_n) - d, \quad (a)$$

$$l_n = l(\Delta\sigma_n) = F_n^* W_d^* W_d r_n + \alpha W_m^* W_m(\Delta\sigma_n - \Delta\sigma_{apr}), \quad (b)$$

$$\beta_n = \|l_n\|^2/\|l_{n-1}\|^2, \tilde{l}_n = l_n + \beta_n \tilde{l}_{n-1}, \tilde{l}_0 = l_0, \quad (c)$$

$$k_n = (\tilde{l}_n, l_n)/\{\|W_d F_n \tilde{l}_n\|^2 + \alpha\|W_m \tilde{l}_n\|^2\}, \quad (d)$$

$$\Delta\sigma_{n+1} = \Delta\sigma_n - k_n \tilde{l}_n. \quad (e) (7)$$

where $W_d$ and $W_m$ are the data and model parameters weighting matrices, $k_n$ is a length of the iteration step, and $l_n$ is the gradient direction, computed using the adjoint Fréchet derivative (sensitivity) matrix, $F_n^*$.

The appropriate selection of the data and model parameters weighting matrices is very important for the success of the inversion. The data weights can be determined as a diagonal matrix formed by the inverse absolute values of the normal field. Computation of the model weighting matrix can be based on sensitivity analysis. In this embodiment, $W_m$ can be selected as the square root of the sensitivity matrix in the initial model:

$$W_m = \sqrt{\text{diag}(F_0^* F_0)^{1/2}}. \quad (8)$$

As a result, a uniform sensitivity of the data can be obtained to different model parameters.

Currently preferred is application of the adaptive regularization method, although other methods can be effective. The regularization parameter $\alpha$ is updated in the process of the iterative inversion as follows:

$$\alpha_n = \alpha_1 q^{n-1}; n=1, 2, 3 \ldots; 0<q<1. \quad (9)$$

In order to avoid divergence, an iteration can begin from a value of $\alpha_1$, which can be obtained as a ratio of the misfit functional and the stabilizer for an initial model, then reduce an according to formula (9) on each subsequent iteration and continuously iterate until the misfit condition is reached:

$$\|A(\Delta\sigma_{\alpha n0}) - d\|^2 = \delta, \quad (10)$$

where $\delta$ is the level of noise in the observed data. Parameter q controls the rate of the regularization parameter decrease in the process of inversion. This parameter is usually selected within an interval [0.5; 0.9].

Formula (7) demonstrates that every iteration step requires at least one forward modeling solution to find the predicted data, $A(\Delta\sigma_n)$. Additional computations are needed to find the Fréchet derivative (sensitivity matrix), $F_n$, and the optimal length of the iteration step $k_n$. It is known for those who are skilled in the field of geophysical inversion, that the Fréchet derivative can be computed using the adjoint operators to the forward modeling operator, formula (3) (Zhdanov, 2002). Although the above regularized 3-D focusing nonlinear inversion technique is preferred, other inversion schemes can also be used such as, but not limited to, smooth inversion, laterally constrained inversion, and the like.

As a result, using the method of the current invention the observed effective complex conductivity of the rock formation can be determined as a function of position (x, y, z) and frequency ω (or time, t) using a 3-D EM inversion technique: $\sigma_e^{obs}(x, y, z|\omega \text{ or } t)$. The present invention is advantageous in that it transforms the recovered effective complex conductivity, $\sigma_e^{obs}(x, y, z|\omega \text{ or } t)$, into the conductivity relaxation models of the rock formations which are used for subsurface material characterization.

In a preferred embodiment of the present invention, the material characterization and mineral discrimination can be based on a composite geoelectrical model of the rock formations, which generates a conductivity relaxation model with the parameters directly related by analytical expressions to the physical characteristics of the microstructure of the rocks and minerals (micro geometry and conductivity parameters). This composite conductivity relaxation model can be derived using the effective medium theory (EMT) for a composite medium. However, the existing form of EMT does not allow including the IP effect in the general model of heterogeneous rocks. The present invention demonstrates that the EMT formalism can be used to obtain analytical expressions for the theoretical effective conductivity of a polarizable rock formation. A unified physical—mathematical model can be developed which can be used for examining the EM effects in complex rock formations with different mineral structures and electrical properties. Further, it takes into account the mineralization and/or fluid content of the rocks, the matrix composition, porosity, anisotropy, and polarizability of the formations.

Figure 2:
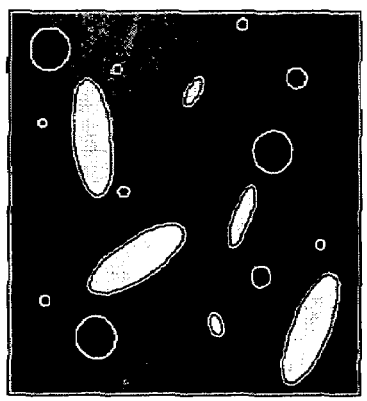
FIG. 2 is a typical example of a multi-phase model of the rock composed of a set of different types of randomly oriented grains.

FIG. 2 shows a typical example of a multi-phase model of the rock. In the preferred embodiment of the present invention, a complex heterogeneous rock formation is represented as a composite model formed by a homogeneous host medium of a volume V with a (complex) conductivity tensor $\hat{\sigma}_0(r)$ (where r is an observation point) filled with the grains of arbitrary shape and conductivity.

In the present instance, the rock can be considered to be composed of a set of N different types of grains, the lth grain type having (complex) tensor conductivity $\hat{\sigma}_l$. The grains of the lth type have a volume fraction $f_l$ in the medium and a particular shape and orientation. Therefore, the total conductivity tensor of the model, $\hat{\sigma}(r)$, has the following distribution for volume fraction $f_l$ and volume fraction $$f_0 = \left(1 - \sum_{l=1}^{N} f_l\right),$$

respectively:

$$\hat{\sigma}(r) = \begin{cases} \hat{\sigma}_0 \text{ for volume fraction } f_0 = \left(1 - \sum_{l=1}^{N} f_l\right), \\ \hat{\sigma}_l \text{ for volume fraction } f_l. \end{cases} \quad (11)$$

The polarizability effect is usually associated with surface polarization of the coatings of the grains. The surface polarization is manifested by accumulating electric charges on the surface of the grain. A double layer of charges is created on the grain's surface, which results in the voltage drop at this surface. It has been shown experimentally that for relatively small external electric fields used in electrical exploration, the voltage drop, Δu, is linearly proportional to the normal current flow at the surface of the particle, $j_n = (n \cdot j)$. That is, at the surface of the grain $$\Delta u = k(n \cdot j) \quad (12)$$

where n is a unit vector of the outer normal to the grain's surface, and k is a surface polarizability factor, which, in general, is a complex frequency dependent function. This function is usually treated as the interface impedance which characterizes the boundary between the corresponding grain and surrounding host medium and describes the interfacial or membrane polarization.

A homogeneous effective medium with the conductivity tensor $\hat{\sigma}_e$ can be substituted for the original heterogeneous composite model and subjected to a constant electric field, $E^b$, equal to the average electric field in the original model:

$$E^b = (E) = V^{-1} \iiint_V E(r) dv. \quad (13)$$

The effective conductivity is defined from the condition that the current density distribution $j_e$ in an effective medium is equal to the average current density distribution in the original model:

$$j_e = \hat{\sigma}_e \cdot E^b = \hat{\sigma}_e \cdot (E) = (\hat{\sigma} \cdot E). \quad (14)$$

In order to find the effective conductivity tensor $\hat{\sigma}_e$, the given inhomogeneous composite model can be represented as a superposition of a homogeneous infinite background medium with the conductivity tensor $\hat{\sigma}_b$ and the anomalous conductivity $\Delta\hat{\sigma}(r)$:

$$\hat{\sigma}(r) = \hat{\sigma}_b + \Delta\hat{\sigma}(r). \quad (15)$$

From (15) and (14), can be derived:

$$\hat{\sigma}_e \cdot E^b = \hat{\sigma}_b \cdot E^b + (\Delta\hat{\sigma} \cdot E). \quad (16)$$

Thus, the effective conductivity tensor, $\hat{\sigma}_e$, can be found from equation (16), if one determines the average excess electric current $(\Delta\hat{\sigma} \cdot E)$. The last problem can be solved using the integral form of Maxwell's equations, (1) and (2).

A quasi-linear (QL) approximation (Zhdanov, 2002) can be used to represent the electric field as follows:

$$\Delta\hat{\sigma}(r') \cdot E(r') = \hat{m}(r') \cdot E^b, \quad (17)$$

where $\hat{m}(r')$ is the material property tensor.

Note that exact representation of formula (17) always exists because the corresponding material property tensor can always be found for any given fields $E(r')$ and $E^b$.

Substituting (17) into (14), taking into account (15):

$$j_e = \hat{\sigma}_e \cdot E^b = \hat{\sigma}_b \cdot E^b + (\hat{m}) \cdot E^b.$$

Notably:

$$\hat{\sigma}_e = \hat{\sigma}_b + (\hat{m}). \quad (18)$$

Thus, in order to determine the effective conductivity of the composite polarized medium, the average value can be found of the material property tensor, $(\hat{m})$.

One can represent the electric field $E(r)$ generated in a homogeneous anisotropic background medium by currents induced within the anomalous conductivity $\Delta\hat{\sigma}(r)$ using an integral form of the Maxwell's equations:

$$E(r) = E^b + \iiint_V \hat{G}_b(r|r') \cdot [\Delta\hat{\sigma}(r') \cdot E(r')] dv', \quad (19)$$

where V is the volume occupied by all inhomogeneities, and $\hat{G}_b(r|r')$ is a Green's tensor for the homogeneous anisotropic full space.

In the preferred embodiment of the current invention, an assumption is made that in addition to electrical heterogeneity, the medium is characterized by polarizability effects which are manifested by the surface polarization of the grains. Mathematically, the surface polarization effect can be included in the general system of Maxwell's equations by adding the following boundary conditions on the surfaces $S_l$ of the grains:

$$[n \times (E^+(r') - E^-(r'))]_{S_l} = -[n \times \nabla' \Delta u(r')]_{S_l}, \quad (20)$$

where $E^+$ designates the boundary value of electric field $E(r)$ when the observation point tends to the boundary $S_l$ of the lth grain from the inside of the grains, and $E^-$ if this point tends to the boundary from the outside of the grains.

According to formula (12), assuming that the voltage drop at the surface of the grain is proportional to the normal current:

$$\Delta u = k(n(r') \cdot j(r')) = k(n(r') \cdot \hat{\sigma}(r') \cdot E(r')), \quad (21)$$

where current $j(r')$ is taken for the internal side of the grain's surface.

Therefore, electric field due to the surface polarization effect $E^p(r)$ can be represented as an electric field of a specified discontinuity formula (20):

$$E^p(r) = \iint_S \hat{G}_b(r|r') \cdot n(r') k \sigma_b (n(r') \cdot \hat{\sigma}(r') \cdot E(r')) ds'. \quad (22)$$

where S stands for the superposition of all surfaces $S_l$ of the entire ensemble of grains, $$S = \bigcup_{l=1}^{N} S_l,$$

and vector $n(r')$ is directed outside the grains.

Substituting expression (17) into formula (22), the total electric field caused by the effects of both the electromagnetic induction and induced polarization is represented as follows:

$$E(r) = E^b + \iiint_V \hat{G}_b(r|r') \cdot [\hat{m}(r') \cdot E^b] dv' + \iint_S \hat{G}_b(r|r') \cdot n(r') (n(r') \cdot \hat{\xi}(r') \cdot [\hat{m}(r') \cdot E^b]) ds', \quad (23)$$

where $\hat{\xi}(r')$ is equal to:

$$\hat{\xi}(r') = k\sigma_b \hat{\sigma}(r') \cdot (\Delta\hat{\sigma}(r'))^{-1}. \quad (24)$$

In this particular embodiment, discussion is restricted to the low frequency approximation (quasi-static model of the field), where $\alpha_l/\omega_l \ll 1$; $\alpha_l$ is a characteristic size of a grain of the lth type, and $\omega_l$ is a wavelength in that grain. In this case, a QL approximation can be used for the integrals over $V_l$ and $S_l$ and assume that the material property tensor is constant in the grain with the volume $V_l$:

$$\hat{m}(r') = \hat{m}_l, \quad r' \in V_l. \quad (25)$$

Note, however, that in the case of spherical or elliptical grains the material property tensor is always constant within the spherical and/or elliptical inclusions. After some algebra, expression (23) can be written in the form:

$$E(r) = E^b + \iiint_V \hat{G}_b(r|r') \cdot \hat{q}(r') dv' \cdot E^b. \quad (26)$$

where:

$$\hat{q}(r') = [\hat{I} + \hat{p}(r')] \cdot \hat{m}(r'), \quad \hat{q}_l = \hat{q}(r'), \quad r' \in V_l, \quad (27)$$

$$\hat{p}(r') = \hat{\Gamma}_l^{-1} \cdot \hat{\Lambda}_l \hat{\xi}(r'), \quad \hat{p}_l = \hat{p}(r'), \quad r' \in V_l, \quad (28)$$

where $\hat{q}$ and $\hat{p}$ are volume and surface polarizability tensors, respectively, and $\hat{\Gamma}_l$ and $\hat{\Lambda}_l$ are volume and surface depolarization tensors:

$$\hat{\Gamma}_l = \iiint_{V_l} \hat{G}_b(r|r') dv', \quad (29)$$

$$\hat{\Lambda}_l = \iint_{S_l} \hat{G}_b(r|r') \cdot n(r') n(r') ds'. \quad (30)$$

Equation (26) shows that the surface polarization effect introduced by formula (22) can be represented by the equivalent volume polarization effect and combined with the electromagnetic induction phenomenon in one integral expression.

In yet another embodiment of the present invention, a constructive approach for determining the effective conductivity of the heterogeneous polarizable medium can be presented. In order to solve this problem, the average value of the material property tensor, $\langle \hat{m} \rangle$ should be found. According to equation (27) this tensor is related to the volume polarizability tensor $\hat{q}$ by the following formula:

$$\hat{m} = [\hat{I} + \hat{p}]^{-1} \hat{q}. \quad (31)$$

Therefore, in order to find $\hat{m}$, tensor $\hat{q}$ can be determined as follows. A "polarized" anomalous conductivity $\Delta\hat{\sigma}^p(r)$ can be formulated as:

$$\Delta\hat{\sigma}^p(r) = [\hat{I} + \hat{p}(r)] \cdot \Delta\hat{\sigma}(r). \quad (32)$$

Multiplying both sides of (26) by $\Delta\hat{\sigma}^p(r)$:

$$\hat{q}(r) = \Delta\hat{\sigma}^p(r) + \Delta\hat{\sigma}^p(r) \cdot \iiint_V \hat{G}_b(r|r') \cdot \hat{q}(r') dv'. \quad (33)$$

Solving equation (33), the volume polarizability tensor, $\hat{q}_l$ for every grain is shown as:

$$\hat{q}_l = [\hat{I} - \Delta\hat{\sigma}^p \cdot \hat{\Gamma}_l]^{-1} \cdot \Delta\hat{\sigma}^p \cdot [\hat{I} - \hat{\Gamma}_l(\hat{q})]. \quad (34)$$

Taking an average value of both sides of formula (34), and solving the resulting equation for $\langle \hat{q} \rangle$:

$$\langle \hat{q} \rangle = ([\hat{I} - \Delta\hat{\sigma}^p \cdot \hat{\Gamma}]^{-1} ([\hat{I} - \Delta\hat{\sigma}^p \cdot \hat{\Gamma}]^{-1} \cdot \Delta\hat{\sigma}^p). \quad (35)$$

According to equation (27), the average value of the material property tensor is:

$$\langle \hat{m} \rangle = ([\hat{I} + \hat{p}]^{-1} \hat{q}). \quad (36)$$

Substituting (36) into (18), results in:

$$\hat{\sigma}_e = \hat{\sigma}_b + [\hat{I} + \hat{p}_0]^{-1} \hat{q}_0 f_0 + \sum_{l=1}^{N} [\hat{I} + \hat{p}_l]^{-1} \hat{q}_l f_l. \quad (37)$$

This concludes the construction of the generalized effective medium theory of the IP effect (GEMTIP) and the corresponding conductivity model. Hence, an important feature of the present invention is the ability to calculate the effective conductivity for any multi-phase polarized composite medium using formula (37). Advantageously, the methods of the present invention make application of this method particularly suitable for use in a multi-phase medium, especially those having complex compositions, e.g. at least two phases and most often greater than two.

The above methods can be effectively incorporated into a system which includes an array of receivers which are operatively coupled to a data storage device. The data storage device can be configured for acquiring the EM data responses which pass through the underground formation. These responses can be communicated to a data processor which is configured to apply the above methods. This can be accomplished using a software program or set of code instructions embodied in a data storage medium, e.g. hard drive or portable media. The data processor can be configured for inputting of the EM data responses; applying a 3-D EM inversion technique to the EM data responses to determine an observed effective complex conductivity; transforming said observed effective complex conductivity into a conductivity relaxation model using an analytical expression of theoretical effective conductivity, said analytical expression being a multi-phase physical and mathematical model of a composite medium; calculating intrinsic physical and geometrical parameters of the composite medium using the analytical expression; determining percent content of constituent portions of the composite medium as a function of a position within the underground formation from the parameters; and correlating the parameters with known geological formations.

Similarly, the above methods related to the manipulation of the received data can be embodied on a computer readable data storage medium having computer readable code thereon for manipulating electromagnetic data to identify and map underground formations. The storage medium can include several computer readable codes or routines for performing the above discussed calculations. For example, these routines can include an input routine for receiving the electromagnetic data in the form of amplitude and phase or waveform data responses; a 3-D EM inversion routine for converting the EM data responses to an observed effective complex conductivity; a transformation routine for transforming the observed effective complex conductivity into a conductivity relaxation model using an analytical expression of theoretical effective conductivity, said analytical expression being a multi-phase physical and mathematical model of a composite medium; a calculation routine for calculating intrinsic physical and geometrical parameters of the composite medium using the analytical expression; an evaluation routine determining percent content of constituent portions of the composite medium as a function of a position with the underground formation; an output routine for correlating the parameters with known geological formations and outputting correlations.

These routines can be embodied in a computer readable data storage medium such as, but not limited to, floppy disk, compact disk (CD-ROM), digital video disk (DVD), flash memory (e.g., a flash drive or USB drive), read only memory, or a propagated signal (e.g. Internet communications using the internet protocol), or the like. New types of computer readable medium may also be developed in the future and may also be used to distribute computer software implementing the method of the present invention.

EXAMPLES

The following examples illustrate various approaches of applying the above methods in accordance with the present invention. However, it is to be understood that the following are only exemplary or illustrative of the application of the principles of the present invention. Numerous modifications and alternative compositions, methods, and systems can be devised by those skilled in the art without departing from the spirit and scope of the present invention. The appended claims are intended to cover such modifications and arrangements. Thus, while the present invention has been described above with particularity, the following Examples provide further detail in connection with several specific embodiments of the invention.

Example 1

Consider first a composite model with isotropic grains of arbitrary shape. In this case all conductivities become scalar functions:

$$\hat{\sigma}_0 = \hat{I}\sigma_0, \Delta\hat{\sigma}_l = \hat{I}\Delta\sigma_l^p = (\hat{I} - \hat{p}_l)\Delta\sigma_l.$$

Therefore, assuming $\sigma_b = \sigma_0$:

$$\hat{\sigma}_e = \hat{I}\sigma_0 + \Sigma_{l=1}^N [\hat{I} + \hat{p}_l]^{-1} [\hat{I} - (\hat{I} + \hat{p}_l)\Delta\sigma_l \hat{\Gamma}_l]^{-1} [\hat{I} + \hat{p}_l]\Delta\sigma_l f_l. \quad (38)$$

Figure 3:
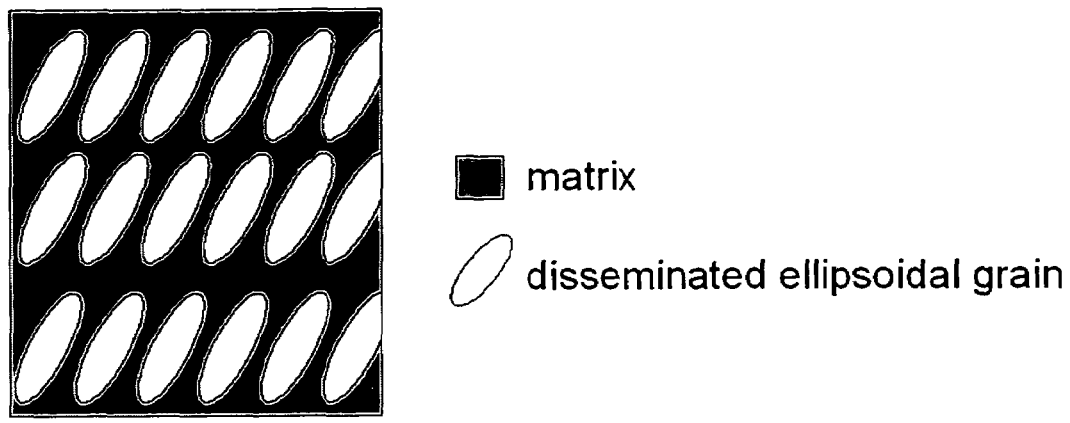
FIG. 3 is an example of electrically anisotropic media: a multi-phase model of the rock is composed of a set of ellipsoidal grains oriented in one direction.

It can be demonstrated that if the grains have nonisometric shape (e.g., ellipsoidal shape) but random orientation (see FIG. 2), averaging of the tensor terms in expression (38) will result in scalarization. Therefore, the effective medium conductivity will become a scalar function. However, if all the grains are oriented in one specific direction, as shown in FIG. 3, the effective conductivity of this medium will become anisotropic. Thus, the effective conductivity may be a tensor in spite of the fact that the background medium and all the grains are electrically isotropic.

Example 2

In another embodiment of the present invention, an isotropic multi-phase composite model formed by a homogeneous host medium of a volume V with a conductivity $\sigma_0$ filled with grains of spherical shape is considered. Assuming also a set of N different types of grains, the lth grain type having radius $\alpha_l$, conductivity $\sigma_l$, and surface polarizability $k_l$. In this model, both the volume and the surface depolarization tensors are constant scalar tensors equal to:

$$\hat{\Gamma}_l = \Gamma_l \hat{I} = -\hat{I}\frac{1}{3\sigma_b}\hat{I}, \hat{\Lambda}_l = \Lambda_l \hat{I} = \frac{2}{3\sigma_b a_l}\hat{I}. \quad (39)$$

The corresponding tensor formulas for conductivities, tensors $\hat{m}$ and $\hat{q}$, can be substituted by the scalar equations. For example, assuming $\sigma_b = \sigma_0$, the following scalar formula for the effective conductivity of the polarized inhomogeneous medium is obtained:

$$\sigma_e = \sigma_0 + \sum_{l=1}^N [1 - (1+p_l)\Delta\sigma_l \Gamma_l]^{-1} \Delta\sigma_l f_l. \quad (40)$$

Substituting expression (39) for volume depolarization tensor, an expression for the effective resistivity of the composite polarized medium follows:

$$\rho_e = \rho_0 \left\{ 1 + 3\sum_{l=1}^N \left[ f_l \frac{\rho_0 - \rho_l}{2\rho_l + \rho_0 + 2k_l a_l^{-1}} \right] \right\}^{-1}, \quad (41)$$

where $\rho_0 = 1/\sigma_0$, $\rho_l = 1/\sigma_l$.

According to experimental data, the surface polarizability factor is a complex function of frequency. The surface polarizability of the lth grain can be represented as:

$$k_l = \alpha_l/2(2\rho_l + \rho_0)(i\omega\tau_l)^{-C_l}, \quad (42)$$

After some algebra:

$$\rho_e = \rho_0 \left\{ 1 + \sum_{l=1}^{N} \left[ f_l M_l \left[ 1 - \frac{1}{1 + (i\omega\tau_l)^{C_l}} \right] \right] \right\}^{-1}, \quad (43)$$

where $$M_l = 3\frac{\rho_0 - \rho_l}{2\rho_l + \rho_0}, \quad (44)$$

and $\tau_l$ and $C_l$ are the time and relaxation parameters, respectively.

Following Wait (1982), the model can be adopted:

$$k_l = \alpha_l(i\omega)^{-C_l}, \quad (45)$$

which fits the experimental data, where $\alpha_l$ are some empirical surface polarizability coefficients, measured in the units $[\alpha_l]=(\text{Ohm}\times\text{m}^2)/\text{sec}^{C_l}$. Therefore from (45) and (42), the time parameter $\tau_l$ can be expressed as:

$$\tau_l = \left[ \frac{a_l}{2\alpha_l}(2\rho_l + \rho_0) \right]^{1/C_l}. \quad (46)$$

Note that, in the case of the metallic particles, one can assume that $\rho_l/\rho_0 \ll 1$, and thus:

$$M_l \approx 3 \quad (47)$$

Therefore, equation (43) takes the form:

$$\rho_e = \rho_0 \left\{ 1 + 3\sum_{l=1}^{N} \left[ f_l \left[ 1 - \frac{1}{1 + (i\omega\tau_l)^{C_l}} \right] \right] \right\}^{-1} \quad (48)$$

Example 3

Figure 4:
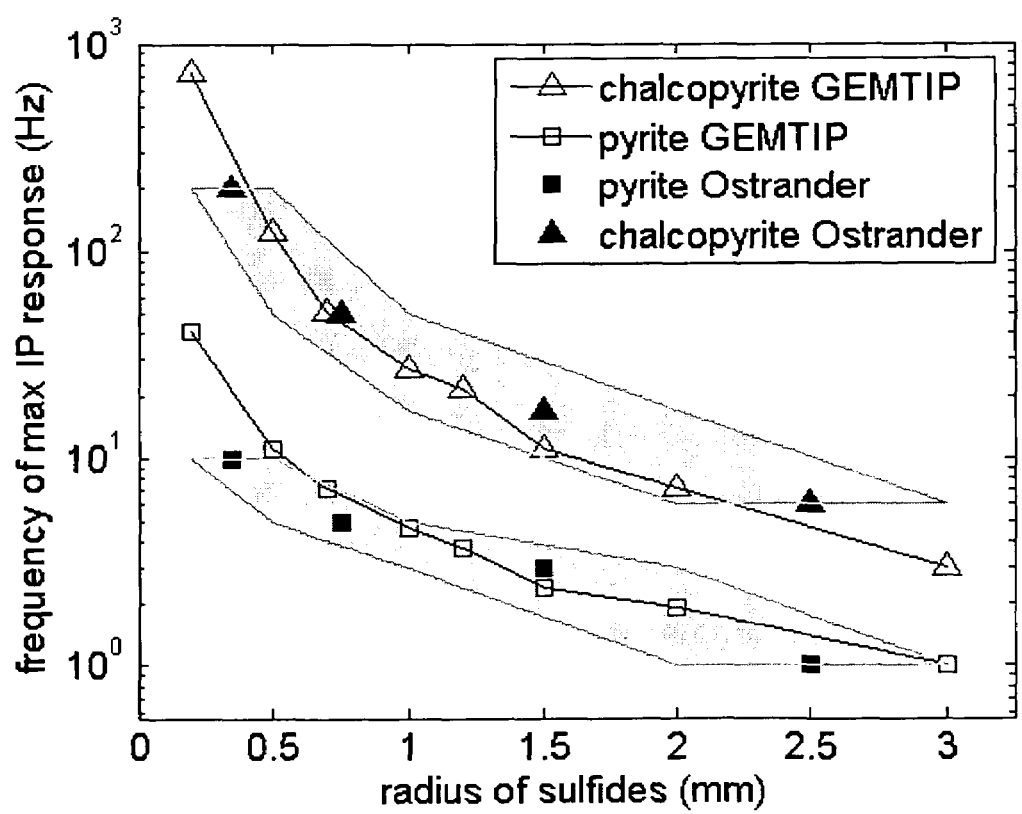
FIG. 4 is a comparison of a composite conductivity model (GEMTIP) of this invention to experimental data published by Ostrander and Zonge (1978), Complex Resistivity Measurements of Sulfide-Bearing Synthetic Rocks: $48^{th}$ Ann. Internat. Mtg., Soc. Expl. Geophys., Expanded Abstracts. The results from Ostrander and Zonge (1978) are plotted as filled symbols (the solid squares represent the data for pyrite, while solid triangles show the data for chalcopyrite). The grey shading indicates the range of disseminated sulfide grain size used for each measurement. Results from the analytical expression of this invention are plotted using the solid line and open symbols.

The new composite conductivity model introduced in this invention has been compared with the practical results of Ostrander and Zonge's 1978 study of chalcopyrite and pyrite bearing synthetic rocks with known matrix resistivities. Ostrander and Zonge (1978) have constructed synthetic rocks bearing either pyrite or chalcopyrite at specific grain sizes using a cement (matrix) of known resistivity. They have also measured the frequency of the peak (maximum) IP response of each rock sample. FIG. 4 presents the results from this study plotted as the solid squares (pyrite) and solid triangles (chalcopyrite). Results from the analytical GEMTIP model of this invention are plotted using the solid line and open symbols. The range of grain sizes for each measurement of maximum IP response is indicated by the grey shading.

For example, the pyrite synthetic rock plotted at 2.5 mm contains pyrite grains from 2 mm to 3 mm. FIG. 4 shows a good correlation between the theoretical analytical curve and Ostrander and Zonge (1978) results. Table 2 gives a detailed overview of modeling parameters used to produce FIG. 4. These results demonstrate that the new composite conductivity model of this invention is in a good agreement with the experimental data.

TABLE 2

| Variables | GEMTIP model | Ostrander and Zonge, 1978 |
|---|---|---|
| $\rho_0$ (Ohm-m) | 300 Ohm-m | (300 ± 75) Ohm-m |
| $f_{chalcopyrite}$ | 5 | Not reported |
| $f_{pyrite}$ | 7.5 | Not reported |
| $\omega$ (Hz) | $10^{-2}$ to $10^6$ Hz | Not reported |
| $C_{chalcopyrite}$ | 0.5 | Not reported |
| $C_{pyrite}$ | 0.75 | Not reported |
| $\rho_{chalcopyrite}$ (ohm-m) | 0.004 Ohm-m | Not reported |
| $\rho_{pyrite}$ (Ohm-m) | 0.3 Ohm-m | Not reported |
| $a_{chalcopyrite}$ (mm) | 0.2-3 mm | 0.2-3 mm |
| $a_{pyrite}$ (mm) | 0.2-3 mm | 0.2-3 mm |
| $\tau_{chalcopyrite}$ (second) | 0.001-0.28 s | Not reported |
| $\tau_{pyrite}$ (second) | 0.02-0.87 s | Not reported |
| $\eta_{chalcopyrite}$ | 0.15 | Not reported |
| $\eta_{pyrite}$ | 0.15 | Not reported |

In yet another embodiment of the present invention, observed effective complex conductivity $p_e^{obs}(x,y,z|\omega$ or $t)$ is transformed into the conductivity relaxation model using a multi-phase physical and mathematical model of the composite medium in the form of the corresponding analytical expressions for the theoretical effective conductivity, $\rho_e(x,y,z|\omega$ or $t)$. This transformation technique is based on the least-square approximation of the observed effective complex conductivity curve (conductivity versus frequency or time for every fixed position) by the theoretical analytical effective complex conductivity curve for every position within the examined volume of the earth:

$$\|\rho_e^{obs}(x,y,z|\omega \text{ or } t) - \rho_e(x,y,z|\omega \text{ or } t)\|^2 = \min, \quad (49)$$

where $\|\ldots\|$ is the corresponding least square norm over the spatial coordinates, (x,y,z), and over the corresponding frequency or time interval.

For example, in a case of the grains of spherical shape, equation (48) can be substituted into (49) to arrive at the following minimization problem for every point (x,y,z) within the medium under investigation:

$$\left\| \rho_e^{obs}(x, y, z | \omega \text{ or } t) - \rho_0 \times \right. \\ \left. \times \left\{ 1 + 3\sum_{l=1}^{N} \left[ f_l(x, y, z) \left[ 1 - \frac{1}{1 + (i\omega\tau_l(x, y, z))^{C_l(x,y,z)}} \right] \right] \right\}^{-1} \right\|^2 = \min. \quad (50)$$

A solution of minimization problem (50) can be obtained by a nonlinear least square method. For example, assuming that the effective observed resistivity at K frequencies, $\omega_1, \omega_2, \ldots \omega_K$ was found, the minimization problem can be written in the form:

$$\sum_{k=1}^{K} \left\{ \rho_{e,k}^{obs}(x, y, z) - \rho_0 \times \right. \\ \left. \times \left\{ 1 + 3\sum_{l=1}^{N} \left[ f_l(x, y, z) \left[ 1 - \frac{1}{1 + (i\omega_k\tau_l(x, y, z))^{C_l(x,y,z)}} \right] \right] \right\}^{-1} \right\}^2 = \min. \quad (51)$$

where $\rho_{e,k}^{obs}(x,y,z) = \rho_e^{obs}(x,y,z|\omega_k)$.

Equation (51) can be rewritten in short matrix form as $$(\rho_e^{obs}-B(m))^*(\rho_e^{obs}-B(m))=\min, \quad (52)$$

where asterisk "*" denotes a complex conjugate matrix, $p_e^{obs}=[p_{e1}^{obs}, p_{e2}^{obs}, \ldots p_{ek}^{obs}]$ stands for the observed effective resistivity data, and m is a vector formed by the IP parameters of the analytical curve m=$[f_1, f_2, \ldots f_N; \tau_1, \tau_2, \ldots \tau_N; C_1, C_2, \ldots C_N]$, and B is a forward modeling operator:

$$B(m) = B[f_1, f_2, \ldots f_N; \tau_1, \tau_2, \ldots \tau_N; C_1, C_2, \ldots C_N] = \quad (53)$$

$$\rho_0\left\{1+3\sum_{l=1}^{N}\left[f_l(x,y,z)\left[1-\frac{1}{1+(i\omega_k\tau_l(x,y,z))^{C_l(x,y,z)}}\right]\right]\right\}^{-1}.$$

The minimization problem (51) can be solved using a conjugate gradient (CG) method similar to one described by equation (7):

$$r_n = B(m_n) - \rho_e^{obs}, \quad (a)$$

$$l_n = l(m_n) = F_n^* W_d^* W_d r_n + \alpha W_m^* W_m (m_n - m_{apr}), \quad (b)$$

$$\beta_n = \|l_n\|^2/\|l_{n-1}\|^2,\ \tilde{l}_n = l_n + \beta_n \tilde{l}_{n-1},\ \tilde{l}_0 = l_0, \quad (c)$$

$$k_n = (\tilde{l}_n, l_n)/\{\|W_d F_n \tilde{l}_n\|^2 + \alpha\|W_m \tilde{l}_n\|^2\}, \quad (d)$$

$$m_{n+1} = m_n - k_n \tilde{l}_n, \quad (e)\ (54)$$

where $W_d$ and $W_m$ are the data and model parameters weighting matrices, $k_n$ is a length of the iteration step, and $l_n$ is the gradient direction, computed using the adjoint Fréchet derivative (sensitivity) matrix, $F_n^*$.

The Fréchet derivative (sensitivity) matrix can be found by direct differentiation of the corresponding expression (53) for the forward operator B $[f_1, f_2, \ldots f_N; \tau_1, \tau_2, \ldots \tau_n; C_1, C_2, \ldots C_N]$ with respect to the corresponding IP parameters.

As a result of the CG algorithm (54), the vector of the IP parameters can be obtained as a function of the coordinate of the point within the examined medium:

$$m = m(x,y,z) = [f_1(x,y,z), \ldots f_N(x,y,z); \tau_1(x,y,z), \ldots \tau_N(x,y,z); C_1(x,y,z), \ldots C_N(x,y,z)]. \quad (55)$$

These parameters, according to the principles of the new composite geoelectrical model of the rock formation introduced in this invention, are related by formula (46) to the intrinsic physical and geometrical characteristics of the composite medium: the conductivity contrast between the different phases of the medium, the size and volume of the inclusions, etc. (e.g. conductivities and mineral grain or porous sizes). Moreover, parameters $f_1(x,y,z), \ldots f_N(x,y,z)$ characterize the volume fraction distribution of the different grains of the composite rock and, therefore, can be used for determining the percent content of the economical minerals (e.g., pyrite) in the rock formation as a function of a position within the examined volume of the earth.

These parameters can be correlated with known geological formations by generating the volume images and maps of the IP parameters, determined above, for subsurface material characterization, mineral exploration and mineral discrimination.

The methods and systems of the present invention can be applied in a variety of contexts. Current techniques for obtaining complex conductivity model parameters require rock analysis (on rocks acquired from the field by drilling) performed in a physical lab. The present invention uses remote geophysical data easily determined in the field to produce a 3-D distribution of the model parameters leading to a more realistic representation of the complex rock formations than can be achieved by conventional unimodal conductivity models. This technique can enable the mining and petroleum industry to conduct resource characterization activities cheaper, faster and with less impact on the environment. For example, this technique can determine the internal structure and physical characteristics of different rock formations remotely and without drilling. Further, these methods are cheaper than conventional methods and results in much less environmental impact. The present invention can be used for interpreting ground, borehole, sea-bottom, and airborne electromagnetic data.

Of course, it is to be understood that the above-described arrangements are only illustrative of the application of the principal of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of identifying underground formations, comprising the steps of:

a) acquiring electromagnetic data using electromagnetic (EM) receivers to measure EM data responses in an EM field which passes through an underground formation, said EM data responses being either in frequency or in time domain;

b) determining an observed effective complex conductivity of the underground formation as a function of position and frequency or time using a 3-D EM inversion technique;

c) transforming said observed effective complex conductivity into a conductivity relaxation model as a function of position and frequency or time using an analytical expression of theoretical effective conductivity, said analytical expression being a multi-phase physical and mathematical model of a composite medium;

d) determining intrinsic physical and geometrical parameters of the composite medium using the analytical expression, said parameters including at least one of: conductivity contrast between different phases of the medium, size and volume of inclusions;

e) determining percent content of constituent portions of the composite medium as a function of a position within the underground formation; and f) correlating said parameters with known geological formations.

2. The method of claim 1, wherein said EM field is generated by natural sources.

3. The method of claim 1, wherein the EM field is generated by EM transmitters directing a transient EM field through the underground formation.

4. The method of claim 1, wherein the step of acquiring electromagnetic data includes receiving and recording said electromagnetic data using a receiver and data processor.

5. The method of claim 1, wherein the EM data responses are measured in frequency domain.

6. The method of claim 1, wherein the EM data responses are measured in time domain.

7. The method of claim 1, wherein the underground formation includes mineral bearing or petroleum bearing rocks.

8. The method of claim 1, wherein the inversion technique is based on a regularized 3-D focusing nonlinear inversion of EM data.

9. The method of claim 1, wherein the inversion technique is based on smooth inversion.

10. The method of claim 1, wherein the step of transforming is based on a least-square approximation of the observed effective complex conductivity curve by the theoretical effective complex conductivity curve as a function of frequency or time for every measured position within the underground formation.

11. The method of claim 1, wherein the analytical expression is given by a composite geoelectrical model constructed using a generalized effective medium approach to induced polarization phenomenon.

12. The method of claim 11, wherein the analytical expression is represented by:

$$\hat{\sigma}_e = \hat{\sigma}_b + [\hat{I} + \hat{p}_0]^{-1} \hat{q}_0 f_0 = \sum_{l=1}^{N} [\hat{I} + \hat{p}_l]^{-1} \hat{q}_l f_l$$

where $\hat{\sigma}_e$ is effective conductivity tensor, $\hat{\sigma}_b$ is effective conductivity tensor of a homogeneous background medium, $\hat{I}$ is an identity tensor, $\hat{p}_0$ is a surface polarizability tensor of the homogenous background medium, $\hat{q}_0$ is a volume polarizability tensor of the homogenous background medium, $f_0$ is a volume fraction of the homogeneous background medium, $\hat{p}_l$ is a surface polarizability tensor of an lth type grain of N grain types, $\hat{q}_l$ is a volume polarizability tensor of the lth type grain, and $f_l$ is a volume fraction of the lth type grain.

13. The method of claim 1, wherein the analytical expression is at least two phases.

14. A system for identifying and mapping underground formations, comprising:
    a) an array of receivers operatively coupled to a data storage device for acquiring electromagnetic (EM) data responses in an EM field which passes through an underground formation; and
    b) a data processor configured to accept data from the data storage device, said data processor configured for:
        i) inputting of the EM data responses;
        ii) applying a 3-D EM inversion technique to the EM data responses to determine an observed effective complex conductivity;
        iii) transforming said observed effective complex conductivity into a conductivity relaxation model using an analytical expression of theoretical effective conductivity, said analytical expression being a multi-phase physical and mathematical model of a composite medium;
        iv) calculating intrinsic physical and geometrical parameters of the composite medium using the analytical expression;
        v) determining percent content of constituent portions of the composite medium as a function of a position within the underground formation from the parameters; and
        vi) correlating the parameters with known geological formations.

15. The system of claim 14, wherein the data storage device is coupled to the processor by time delay, wireless, or wired connection.

16. The system of claim 14, wherein the EM data responses are measured in frequency domain.

17. The system of claim 14, wherein the EM data responses are measured in time domain.

18. The system of claim 14, wherein the inversion technique is based on a regularized 3-D focusing nonlinear inversion of EM data.

19. The system of claim 14, wherein the analytical expression is given by a composite geoelectrical model constructed using a generalized effective medium approach to induced polarization phenomenon.

20. The system of claim 14, wherein the analytical expression is at least two phase.

21. A computer readable data storage medium having computer readable code embodied thereon for manipulating electromagnetic data to identify and map underground formations, the-computer readable code comprising:
    a) an input routine for receiving the electromagnetic data in the form of EM data responses;
    b) a 3-D EM inversion routine for converting the EM data responses to an observed effective complex conductivity;
    c) a transformation routine for transforming the observed effective complex conductivity into a conductivity relaxation model using an analytical expression of theoretical effective conductivity, said analytical expression being a multi-phase physical and mathematical model of a composite medium;
    d) a calculation routine for calculating intrinsic physical and geometrical parameters of the composite medium using the analytical expression;
    e) an evaluation routine determining percent content of constituent portions of the composite medium as a function of a position with the underground formation; and
    f) an output routine for correlating the parameters with known geological formations and outputting correlations.

22. The medium of claim 21, wherein the medium is a CD-ROM.

23. The medium of claim 21, wherein the EM data responses are measured in time domain.

24. The medium of claim 21, wherein the inversion routine is based on a regularized 3-D focusing nonlinear inversion of EM data.

25. The medium of claim 21, wherein the analytical expression is given by a composite geoelectrical model constructed using a generalized effective medium approach to induced polarization phenomenon.

26. The medium of claim 21, wherein the analytical expression is at least two phase.

* * * * *